US012790482B2

(12) United States Patent
Xu et al.

(10) Patent No.: US 12,790,482 B2
(45) Date of Patent: Nov. 10, 2026

(54) LIQUID CRYSTAL POLYMER COMPOSITIONS AND CORRESPONDING ARTICLES

(71) Applicant: SYENSQO SPECIALTY POLYMERS USA, LLC, Alpharetta, GA (US)

(72) Inventors: Xiaoling Xu, Roswell, GA (US); Glenn P. Desio, Marietta, GA (US)

(73) Assignee: Syensqo Specialty Polymers USA, LLC, Alpharetta, GA (US)

( * ) Notice: Subject to any disclaimer, the term of this patent is extended or adjusted under 35 U.S.C. 154(b) by 639 days.

(21) Appl. No.: 17/911,392

(22) PCT Filed: Mar. 10, 2021

(86) PCT No.: PCT/EP2021/055984
§ 371 (c)(1),
(2) Date: Sep. 13, 2022

(87) PCT Pub. No.: WO2021/180759
PCT Pub. Date: Sep. 16, 2021

(65) Prior Publication Data

US 2023/0151209 A1 May 18, 2023

Related U.S. Application Data

(60) Provisional application No. 62/988,998, filed on Mar. 13, 2020.

(30) Foreign Application Priority Data

Jun. 8, 2020 (EP) .................................... 20178764

(51) Int. Cl.

| | |
|---|---|
| ***C08L 67/03*** | (2006.01) |
| ***C08G 63/183*** | (2006.01) |
| ***C08G 63/199*** | (2006.01) |
| ***C08G 63/60*** | (2006.01) |

(52) U.S. Cl.
CPC ............ *C08L 67/03* (2013.01); *C08G 63/183* (2013.01); *C08G 63/199* (2013.01); *C08G 63/605* (2013.01)

(58) Field of Classification Search
None
See application file for complete search history.

(56) References Cited

U.S. PATENT DOCUMENTS

2018/0223096 A1* 8/2018 Kim ........................ F21S 45/48

FOREIGN PATENT DOCUMENTS

| | | | |
|---|---|---|---|
| EP | 3158003 | A2 | 4/2017 |
| WO | 02/20698 | A1 | 3/2002 |

OTHER PUBLICATIONS

Rigiflex (Flexible Printed Circuit Boards: Features, Types, and Applications accessed on Apr. 15, 2025 < https://www.rigiflex.com/blog/flexible-printed-circuit-boards-features-types-and-applications/ , 2014) (Year: 2014).*

Kalika, D., et al., Structural, dielectric, and rheological characterization of thermotropic liquid crystalline copolyesters based on 4-hydroxybenzoic acid, 4,4'-dihydroxybiphenyl, terephthalic acid, and isophthalic acid Macromolecules 1991, 24, 11, 3413â3422. (Year: 1991).*

Written Opinion issued in International Application No. PCT/EP2021/055984, mailed May 17, 2021 (6 pages).

International Search Report issued in International Application No. PCT/EP2021/055984, mailed May 17, 2021 (3 pages).

* cited by examiner

*Primary Examiner* — Robert S Jones, Jr.
*Assistant Examiner* — Lily K Sloan
(74) *Attorney, Agent, or Firm* — Osha Bergman Watanabe & Burton LLP

(57) ABSTRACT

Described herein are polymer compositions including a liquid crystal polymer ("LCP") and 1 weight percent ("wt. %") to 25 wt. % of a semi-aromatic, semi-crystalline polyester, relative to the total weight of the LCP and semi-aromatic, semi-crystalline polyester. It was surprisingly discovered that polymer compositions including an LCP in conjunction with a semi-aromatic, semi-crystalline polymer could be melt-extruded into desirable films, as opposed to corresponding polymer compositions. It was further surprisingly discovered that the polymer compositions described herein had improved mechanical performance (tensile strength and tensile elongation), relative to corresponding polymer compositions. Still further, the polymer compositions also unexpectedly had reduced (Tm−Tc) relative to corresponding polymer compositions and, therefore, provided faster cycle times for molded articles formed from the polymer compositions.

16 Claims, No Drawings

LIQUID CRYSTAL POLYMER COMPOSITIONS AND CORRESPONDING ARTICLES

CROSS REFERENCE TO RELATED APPLICATIONS

This application claims priority to U.S. provisional patent application No. 62/988,998, filed on Mar. 13, 2020, and European patent application no. 20178764.5, filed on Jun. 8, 2020, both of which are incorporated herein by reference.

FIELD OF THE INVENTION

The invention relates to polymer compositions including a blend of a liquid crystal polymer and semi-aromatic, semi-crystalline polyester having excellent dielectric performance and mechanical properties. The invention further relates to articles formed from the polymer compositions.

BACKGROUND OF THE INVENTION

For electronic and electric applications, polymeric materials must meet stringent requirements in terms of mechanical properties. Furthermore, in some such application settings, the ability to fabricate electronic an electrical components (e.g. microelectronics) requires the polymeric material to be melt-extruded (e.g. injection molded). Accordingly, there is also a need, in some applications settings, to be able to fabricate uniform and homogenous melt-extruded articles from the polymer compositions.

SUMMARY OF INVENTION

In one aspect, the invention relates to a polymer compositions including (i) a liquid crystal polymer ("LCP") formed from the polycondensation of the following monomers: terephthalic acid, an aromatic diol, a first aromatic dicarboxylic acid, an aromatic hydrocarboxylic acid; and (ii) 1 wt. % to 25 wt. %, of a semi-aromatic, semi-crystalline polyester ("PE") formed from the polycondensation of an aliphatic diol and a second aromatic dicarboxylic acid, relative to the total weight of the LCP and PE, wherein at least one of the first aromatic dicarboxylic acid and aromatic hydroxycarboxylic acid are free of a napthyl group.

In another aspect, the invention relates to an article including the polymer composition of any one of claims 1 to 10. In some embodiments, the article is a mobile electronic device component. In one such embodiment, the article is a printed circuit board.

In another aspect, the invention relates to a film including the polymer composition. In some embodiments, the film has an average thickness of from 5 μm to 200 μm as, measured according to DIN 53370.

DETAILED DESCRIPTION OF THE INVENTION

Described herein are polymer compositions including a liquid crystal polymer ("LCP") and 1 weight percent ("wt. %") to 25 wt. % of a semi-aromatic, semi-crystalline polyester, relative to the total weight of the LCP and semi-aromatic, semi-crystalline polyester. It was surprisingly discovered that polymer compositions including an LCP in conjunction with a semi-aromatic, semi-crystalline polyester could be melt-extruded into desirable articles, as opposed to corresponding polymer compositions (defined below). It was further surprisingly discovered that the polymer compositions described herein had improved mechanical performance (tensile strength and tensile elongation), relative to corresponding polymer compositions. Still further, the polymer compositions also unexpectedly had reduced (Tm−Tc) relative to corresponding polymer compositions and, therefore, provided faster cycle times for injection molded articles formed from the polymer compositions.

As used herein, a corresponding polymer composition is the same as the recited polymer composition, except that it is free of the semi-aromatic, semi-crystalline polyester (having further LCP or an amorphous polyester in place of the semi-aromatic, semi-crystalline polyester). Furthermore, as used herein, Tm, Tg, and Tc refer to, respectively, melting temperature, glass transition temperature and crystallization temperature. Tm, Tg and Tc can be measured using differential scanning calorimetry ("DSC") according to ISO-11357-3.

Furthermore, as used here, any description, even though described in relation to a specific embodiment, is applicable to and interchangeable with other embodiments of the present disclosure; —where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components; any element or component recited in a list of elements or components may be omitted from such list; and any recitation herein of numerical ranges by endpoints includes all numbers subsumed within the recited ranges as well as the endpoints of the range and equivalents.

Unless specifically limited otherwise, the term "alkyl", as well as derivative terms such as "alkoxy", "acyl" and "alkylthio", as used herein, include within their scope straight chain, branched chain and cyclic moieties. Examples of alkyl groups are methyl, ethyl, 1-methylethyl, propyl, 1,1-dimethylethyl, and cyclo-propyl. Unless specifically stated otherwise, each alkyl and aryl group may be unsubstituted or substituted with one or more substituents selected from but not limited to halogen, hydroxy, sulfo, C1-C6 alkoxy, C1-C6 alkylthio, C1-C6 acyl, formyl, cyano, C6-C15 aryloxy or C6-C15 aryl, provided that the substituents are sterically compatible and the rules of chemical bonding and strain energy are satisfied. The term "halogen" or "halo" includes fluorine, chlorine, bromine and iodine, with fluorine being preferred.

Similarly, unless specifically limited otherwise, the term "aryl" refers to a phenyl, indanyl or naphthyl group. The aryl group may comprise one or more alkyl groups, and are called sometimes in this case "alkylaryl"; for example may be composed of an aromatic group and two C1-C6 groups (e.g. methyl or ethyl). The aryl group may also comprise one or more heteroatoms, e.g. N, O or S, and are called sometimes in this case "heteroaryl" group; these heteroaromatic rings may be fused to other aromatic systems. Such heteroaromatic rings include, but are not limited to furanyl, thienyl, pyrrolyl, pyrazolyl, imidazolyl, triazolyl, isoxazolyl, oxazolyl, thiazolyl, isothiazolyl, pyridyl, pyridazyl, pyrimidyl, pyrazinyl and triazinyl ring structures. The aryl or heteroaryl substituents may be unsubstituted or substituted with one or more substituents selected from but not limited to halogen, hydroxy, C1-C6 alkoxy, sulfo, C1-C6 alkylthio, C1-C6 acyl, formyl, cyano, C6-C15 aryloxy or C6-C15 aryl, provided that the substituents are sterically compatible and the rules of chemical bonding and strain energy are satisfied.

The Liquid Crystal Polymer

The LCP is formed from the polycondensation of the following monomers: terephthalic acid, an aromatic diol, a first aromatic dicarboxylic acid distinct from terephthalic acid, and an aromatic hydroxycarboxylic acid, wherein at least one of the first aromatic dicarboxylic acid and aromatic hydroxycarboxylic acid are free of a napthyl group.

In some embodiments, the aromatic diol is represented by a formula selected from the following group of formulae:

HO—$Ar_1$—OH, and (1)

HO—$Ar_2$-$T_1$-$Ar_3$—OH, (2)

wherein, Ar1 to $Ar_3$ are independently selected $C_6$-$C_{30}$ aryl groups, optionally substituted with one or more substituents selected from the group consisting of halogen, a $C_1$-$C_{15}$ alkyl, and a $C_6$-$C_{15}$ aryl; and $T_1$ is selected from the group consisting of a bond, O, S, —$SO_2$—, —C(═O)—, and a $C_1$-$C_{15}$ alkyl. In some embodiments, the aromatic diol is selected from the group consisting of 1,3-dihydroxybenzene, 1,4-dihydroxybenzene, 2,5-biphenyldiol, 4,4'-biphenol, 4,4'-(propane-2,2-diyl)diphenol, 4,4'-(ethane-1,2-diyl) diphenol, 4,4'-methylenediphenol, bis(4-hydroxyphenyl) methanone, 4,4'-oxydiphenol, 4,4'-sulfonyldiphenol, 4,4'-thiodiphenol, naphthalene-2,6-diol, and naphthalene-1,5-diol. Preferably, the aromatic diol is 4,4'-biphenol. In some embodiments, the first aromatic dicarboxylic acid is independently represented by a formula selected from the following group of formulae:

HOOC—$Ar_1$—COOH, and (3)

HOOC—$Ar_2$-$T_2$-$Ar_3$—COOH, (4)

where $Ar_1$ to $Ar_3$ are given as above and are independently selected; and $T_2$ is selected from the group consisting of a bond, O and S. In some embodiments, the first aromatic dicarboxylic acid is selected from the group consisting of isophthalic acid, 4,4'-biphenyldicarboxylic acid, 4,4'-oxydibenzoic acid, 4,4'-(ethylenedioxy)dibenzoic acid, 4,4'-sulfanediyldibenzoic acid, naphthalene-2,6-dicarboxylic acid, naphthalene-1,4-dicarboxylic acid, naphthalene-1,5-dicarboxylic acid, and naphthalene-2,3-dicarboxylic acid. Preferably the first aromatic dicarboxylic acids is selected from the group consisting of isophthalic acid, naphthalene-2,6-dicarboxylic acid, naphthalene-1,4-dicarboxylic acid, naphthalene-1,5-dicarboxylic acid, and naphthalene-2,3-dicarboxylic acid. Most preferably, the first aromatic dicarboxylic acid is isophthalic acid.

In some embodiments, the aromatic hydroxycarboxylic acid is represented by a formula selected from the group consisting of HO—$Ar_1$—COOH, and (5)

HO—$Ar_2$—$Ar_3$—COOH, (6)

wherein $Ar_1$ to $Ar_3$ are given above and are independently selected. In some embodiments, the aromatic hydroxycarboxylic acid is selected from the group consisting of 4-hydroxybenzoic acid, 3-hydroxybenzoic acid, 6-hydroxy-2-naphthoic acid, 6-hydroxy-1-naphthoic acid, 2-hydroxy-1-naphthoic acid, 3-hydroxy-2-naphthoic acid, 1-hydroxy-2-naphthoic acid, 5-hydroxy-1-naphthoic acid, and 4'-hydroxy-[1,1'-biphenyl]-4-carboxylic acid. Preferably, the aromatic hydroxycarboxylic acid is selected from the group consisting of 4-hydroxybenzoic acid, 6-hydroxy-2-naphthoic acid, 6-hydroxy-1-naphthoic acid, 2-hydroxy-1-naphthoic acid, 3-hydroxy-2-naphthoic acid, 1-hydroxy-2-naphthoic acid, and 5-hydroxy-1-naphthoic acid. Most preferably, the aromatic hydroxycarboxylic acid is 4-hydroxybenzoic acid.

In some embodiments, the LCP formed from the aforementioned monomers has recurring units $R_{LCP1}$ to $R_{LCP4}$. Recurring unit $R_{LCP1}$ is represented by the following formula:

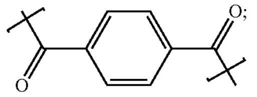

(7)

recurring units $R_{LCP2}$ is represented by either one of the following formulae:

-[—O—$Ar_1$—O—]-, and (8)

-[—O—$Ar_2$-$T_2$-$Ar_3$—O—]-; (9)

recurring unit $R_{LCP3}$ is represented by either one of the following formulae:

-[—OC—$Ar_1$—CO—]-, and (10)

—[—OC—$Ar_2$-$T_2$-$Ar_3$—CO—]-; and (11)

recurring unit $R_{LCP4}$ is represented by either one of the following formulae:

-[—O—$Ar_1$—CO—]-, and (12)

-[—O—$Ar_2$—$Ar_3$—CO—]-. (13)

wherein $Ar_1$ to $Ar_3$, $T_1$ and $T_2$ are given above and are independently selected. The person of ordinary skill in the art will recognize that $R_{LCP1}$ according to formulae (7) is formed from terephthalic acid; $R_{LCP2}$ according to formulae (8) and (9) are respectively formed from monomers according to formulae (1) and (2); $R_{LCP3}$ according to formulae (10) and (11) are respectively formed from monomers according to formulae (3) and (4); and $R_{LCP4}$ according to formulae (12) and (13) are formed from monomers according to formulae (5) and (6). As such, the selection of $Ar_1$ to $Ar_3$, $T_1$ and $T_2$ for the monomers in formulae (1) to (6) also selects $Ar_1$ to $Ar_3$, $T_1$ and $T_2$ for recurring units $R_{LCP2}$ to $R_{LCP4}$. Preferably, recurring units $R_{LCP1}$ to $R_{LCP4}$ are respectively formed from the polycondensation of terephthalic acid, 4,4'-biphenol, isophthalic acid, and 4-hydroxybenzoic acid.

In some embodiments, the total concentration of recurring units $R_{LCP1}$ to $R_{LCP4}$ is at least 50 mol %, at least 60 mol %, at least 70 mol %, at least 80 mol %, at least 90 mol %, at least 95 mol %, at least 99 mol %, or at least 99.9 mol %. In some embodiments, the concentration of the terephthalic acid is from 5 mol % to 30 mol %, preferably from 10 mol % to 20 mol %. In some embodiments, the concentration of the aromatic diol is from 10 mol % to 30 mol %, preferably from 15 mol % to 25 mol %. In some embodiments, the concentration of the first aromatic dicarboxylic acid is from 1 mol % to 20 mol %, preferably from 1 mol % to 10 mol %. In some embodiments, the concentration of the aromatic hydroxycarboxylic acid is from 35 mol % to 80 mol %, preferably from 45 mol % to 75 mol %, most preferably from 50 mol % to 70 mol %. In one embodiment, the $R_{LCP1}$ to $R_{LCP4}$ are, respectively, derived from terephthalic acid, 4,4'-biphenol, isophthalic acid and 4-hydroxybenzoic acid, where the concentration ranges for each recurring unit are within the ranges given above. As used herein, mol % is relative to the total number of recurring units in the polymer, unless explicitly indicated otherwise. For clarity, "derived from" refers the recurring unit formed from polycondensation of the recited monomer, for example, as described above with respect to the relationship between formulae 1 to 6 and 8 to 13.

In some embodiments, the LCP has a Tm of at least 220° C., at least 250° C., or at least 280° C. In some embodiments, the LCP has a Tm of no more than 420° C., no more than 390° C., or no more than 360° C. In some embodiments, the LCP has a Tm of from 220° C. to 420° C., from 250° C. to 390° C., or from 280° C. to 360° C.

In some embodiments, the LCP has a number average molecular weight ("Mn") of at least 5,000 g/mol. In some embodiments, the LCP has an Mn of no more than 20,000 g/mol. In some embodiments, the LCP has an Mn of from 5,000 g/mol to 20,000 g/mol. The number average molecular weight Mn can be determined by gel permeation chromatography (GPC) according to ASTM D5296 and using hexafluoroisopropanol solvent and poly(methyl methacrylate) standard.

The LCP described herein can be prepared by any conventional method adapted to the synthesis of LCPs.

The Semi-Aromatic, Semi-Crystalline Polyester

The polymer composition includes a semi-aromatic, semi-crystalline polyester. As used herein, a "semi-aromatic" polyester refers to a polymer including at least 50 mol % recurring units $R_{PE}$ having at least one ester group (—C(O)O—) and at least one aryl group. Additionally as used herein, a "semi-crystalline polyester" (or a "semi-crystalline polymer") is a polyester (or polymer) that has a heat of fusion ("$\Delta H_f$") of at least 5 joules per gram ("J/g") at a heating rate of 20 C/min (an amorphous polyester (or polymer) comprises a $\Delta H_f$ of less than 5 J/g at a heating rate of 20 C/min). $\Delta H_f$ can be measured according to ASTM D3418. In some embodiments, the semi-aromatic, semi-crystalline polyester has at least 60 mol %, at least 70 mol %, at least 80 mol %, at least 90 mol %, at least 95 mol %, at least 99 mol % or at least 99.9 mol % of recurring unit $R_{PE}$. As used herein, mol % is relative to the total number of recurring units in the indicated polymer, unless explicitly noted otherwise.

Recurring unit $R_{PE}$ is formed from the polycondensation of an aliphatic diol and an aromatic dicarboxylic acid. Examples of desirable aliphatic diols include, but are not limited to, 1,4-cyclohexanedimethanol, ethylene glycol, 1,2-propanediol, 1,3-propanediol, 1,4-butanediol, 1,5-pentanediol, 1,6-hexanediol, 1,8-octanediol, 1,10-decanediol, 2,2,4-trimethyl 1,3-pentanediol, 2,2,4,4-tetramethyl-1,3-cyclobutanediol, and neopentyl glycol. Preferably, the aliphatic diol is 1,4-cyclohexanedimethanol, ethylene glycol, 1,4-butanediol or neopentyl glycol. Most preferably, the aliphatic diol is 1,4-cylohexanedimenthanol. Examples of desirable aromatic dicarboxylic acids include, but are not limited to, terephthalic acid, isophthalic acid, and naphthalene dicarboxylic acids (e.g. 2,6-napthalene dicarboxylic acid).

In some embodiments, the semi-aromatic, semi-crystalline polyester is selected from the group consisting of poly(cyclohexanedimethylene terephthalate) ("PCT"), polyethylene terephthalate ("PET"), polybutylene terephthalate ("PBT"), polyethylene naphthalate ("PEN") and polybutylene naphthalate ("PBN"). Most preferably, the semi-aromatic, semi-crystalline polyester is PCT.

In some embodiments, the semi-aromatic, semi-crystalline polyester has an intrinsic viscosity of from about 0.4 to about 2.0 deciliters/gram ("dl/g") as measured in a 60:40 phenol/tetrachloroethane mixture or similar solvent at about 30° C. Preferably, the LCP has an intrinsic viscosity of 0.5 to 1.4 dl/g.

In some embodiments, the, the semi-aromatic, semi-crystalline polyester has a Tm of at least 250° C., preferably at least 260° C., more preferably at least 270° C. and most preferably at least 280° C. In some embodiments, the, the semi-aromatic, semi-crystalline polyester has a Tm of at most 350° C., preferably at most 340° C., more preferably at most 330° C. and most preferably at most 320° C. In some embodiments, the semi-aromatic, semi-crystalline polyester has a Tm of from 250° C. to 350° C., from 260° C. to 340° C., from 270° C. to 330° C., or from 280° C. to 320° C. In some embodiments, the semi-aromatic, semi-crystalline polyester has a glass transition temperature ("Tg") of at least 60° C., at least 70° C., or at least 80° C. In some embodiments, the semi-aromatic, semi-crystalline polyester has a Tg of no more than 180° C., no more than 160° C., or no more than 140° C. In some embodiments, the semi-aromatic, semi-crystalline polyester has a Tg of from 60° C. to 180° C., from 70° C. to 160° C., or from 80° C. to 140° C.

As used herein, a semi-crystalline polyester comprises a heat of fusion ("$\Delta H_f$") of at least 5 joules per gram ("J/g") at a heating rate of 20 C/min.

The Polymer Composition

The polymer composition includes the LCP and the semi-aromatic, semi-crystalline polyester. In some embodiments, the total concentration of the LCP and the semi-aromatic, semi-crystalline polyester in the polymer composition is at least 50 wt. %, at least 60 wt. %, at least 70 wt. %, at least 80 wt. %, at least 90 wt. %, at least 95 wt. %, at least 98 wt. %, at least 99 wt. %, at least 99.5 wt % or at least 99.7 wt. %, relative to the total weight of the polymer composition. As used herein, wt. % is relative to the total weight of the polymer composition unless explicitly stated otherwise.

In some embodiments, the polymer composition includes at least 60 wt. % or at least 70 wt. % of the LCP, with respect to the total weight of the LCP and semi-aromatic, semi-crystalline polyester in the polymer composition. In some embodiments, the polymer composition includes no more than 99 wt. % or no more than 95 wt. % of the LCP, with respect to the total weight of the LCP and semi-aromatic, semi-crystalline polyester in the polymer composition. In some embodiments, the polymer compositions includes from 60 wt. % to 99 wt. %, from 60 wt. % to 95 wt. %, from 70 wt. % to 99 wt. %, or from 70 wt. % to 95 weight % of the LCP, with respect to the total weight of the LCP and semi-aromatic, semi-crystalline polyester in the polymer composition.

The polymer composition includes 1 wt. % to 25 wt. %, of a semi-aromatic, semi-crystalline polyester, with respect to the total weight of the LCP and semi-aromatic, semi-crystalline polyester in the polymer composition. In some embodiments, the polymer composition includes at least 1 wt. %, at least 2 wt. %, or at least 3 wt. % of the semi-aromatic, semi-crystalline polyester, with respect to the total weight of the LCP and semi-aromatic, semi-crystalline polyester in the polymer composition. In some embodiments, the polymer composition includes no more than 25 wt. %, no more than 20 wt. %, or no more than 15 wt. % of the semi-aromatic, semi-crystalline polyester, with respect to the total weight of the LCP and semi-aromatic, semi-crystalline polyester in the polymer composition. In some embodiments, the polymer composition includes from 1 wt. % to 25 wt. %, from 2 wt. % to 20 wt. %, or from 3 wt. % to 15 wt. % of the semi-aromatic, semi-crystalline polyester, with respect to the total weight of the LCP and semi-aromatic, semi-crystalline polyester in the polymer composition.

While the concentration of the LCP and semi-aromatic, semi-crystalline polyester provided above are with respect to the total weight of the LCP and semi-aromatic, semi-crystalline polyester in the polymer composition, in some embodiments, the same concentrations are present with respect to the total weight of the polymer composition.

The polymer composition may also include a component selected from the group consisting of reinforcing agents, tougheners, plasticizers, colorants, pigments, antistatic agents, dyes, lubricants, thermal stabilizers, light stabilizers, flame retardants, nucleating agents and antioxidants.

A large selection of reinforcing agents, also called reinforcing fibers or fillers, may be added to the composition according to the present invention. They can be selected from fibrous and particulate reinforcing agents. A fibrous reinforcing agent is considered herein to be a material having length, width and thickness, wherein the average length is significantly larger than both the width and thickness. Generally, such a material has an aspect ratio, defined as the average ratio between the length and the largest of the width and thickness of at least 5, at least 10, at least 20 or at least 50. In some embodiments, the fibrous reinforcing agents have an average length of from 3 mm to 50 mm. In some such embodiments, the fibrous reinforcing agents have an average length of from 3 mm to 10 mm, from 3 mm to 8 mm, from 3 mm to 6 mm, or from 3 mm to 5 mm. In alternative embodiments, the fibrous reinforcing agents have an average length of from 10 mm to 50 mm, from 10 mm to 45 mm, from 10 mm to 35 mm, from 10 mm to 30 mm, from 10 mm to 25 mm or from 15 mm to 25 mm. The average length of the fibrous reinforcing agents can be taken as the average length of the fibrous reinforcing agents prior to incorporation into the polymer composition or can be taken as the average length of the fibrous reinforcing agents in the polymer composition. Examples of fibrous reinforcing agents include, but not limited to, glass fibers, carbon fibers, synthetic polymeric fibers, aramid fibers, aluminum fibers, titanium fibers, magnesium fibers, boron carbide fibers, rock wool fibers, and steel fibers. Particulate reinforcing agents include, but not limited to, talc, mica, kaolin, calcium carbonate, calcium silicate, magnesium carbonate and wollastonite).

Among fibrous reinforcing agents, glass fibers are preferred; they include chopped strand A-, E-, C-, D-, S- and R-glass fibers, as described in chapter 5.2.3, p. 43 48 of Additives for Plastics Handbook, 2nd edition, John Murphy. Preferably, the filler is chosen from fibrous fillers. In some embodiments, the glass fiber can be a low $D_k$ glass fiber.

The reinforcing agents may be present in the polymer composition in a total amount of greater than 15 wt. %, greater than 20 wt. % by weight, greater than 25 wt. % or greater than 30 wt. %, based on the total weight of the polymer composition. The reinforcing agents may be present in the polymer composition in a total amount of no more than 45 wt. %. The reinforcing agents may for example be present in the polymer composition in an amount ranging between 20 and 45 wt. %, for example between 30 and 45 wt. %.

In some embodiments, the polymer composition is free of a reinforcing agent. In some film application embodiments, films formed from the presently described blend of LCP and semi-aromatic, semi-crystalline polyester can have significant inhomogeneities due to the presence of a reinforcing agent (especially when the polymer composition includes a fibrous reinforcing agent). Accordingly, in some embodiments, the polymer composition is free of fibrous reinforcing agents. As used herein, a polymer composition free of a component has a component concentration of no more 1 wt. %, no more than 0.5 wt. %, no more than 0.1 wt. %, no more than 0.05 wt. %, or no more than 0.01 wt. %. For example, in embodiments in the which the polymer composition is free of a reinforcing filler, the concentration of the reinforcing filler is more 1 wt. %, no more than 0.5 wt. %, no more than 0.1 wt. %, no more than 0.05 wt. %, or no more than 0.01 wt. %.

The polymer composition of the present invention may also comprise a toughener. A toughener is generally a low glass transition temperature (Tg) polymer, with a Tg for example below room temperature, below 0° C. or even below −25° C. As a result of its low Tg, the toughener are typically elastomeric at room temperature. Tougheners can be functionalized polymer backbones.

The polymer backbone of the toughener can be selected from elastomeric backbones comprising polyethylenes and copolymers thereof, e.g. ethylene-butene; ethylene-octene; polypropylenes and copolymers thereof; polybutenes; polyisoprenes; ethylene-propylene-rubbers (EPR); ethylene-propylene-diene monomer rubbers (EPDM); ethylene-acrylate rubbers; butadiene-acrylonitrile rubbers, ethylene-acrylic acid (EAA), ethylene-vinylacetate (EVA); acrylonitrile-butadiene-styrene rubbers (ABS), block copolymers styrene ethylene butadiene styrene (SEBS); block copolymers styrene butadiene styrene (SBS); core-shell elastomers of methacrylate-butadiene-styrene (MBS) type, or mixture of one or more of the above.

When the toughener is functionalized, the functionalization of the backbone can result from the copolymerization of monomers which include the functionalization or from the grafting of the polymer backbone with a further component.

Specific examples of functionalized tougheners are notably terpolymers of ethylene, acrylic ester and glycidyl methacrylate, copolymers of ethylene and butyl ester acrylate; copolymers of ethylene, butyl ester acrylate and glycidyl methacrylate; ethylene-maleic anhydride copolymers; EPR grafted with maleic anhydride; styrene copolymers grafted with maleic anhydride; SEBS copolymers grafted with maleic anhydride; styrene-acrylonitrile copolymers grafted with maleic anhydride; ABS copolymers grafted with maleic anhydride.

The toughener may be present in the polymer composition in a total amount of greater than 1 wt. %, greater than 2 wt. % or greater than 3 wt. %. The toughener may be present in the polymer composition in a total amount of less than 30 wt. %, less than 20 wt. %, less than 15 wt. % or less than 10 wt. %.

The polymer composition may also include other conventional additives commonly used in the art, including plasticizers, colorants, pigments (e.g. black pigments such as carbon black), antistatic agents, dyes (e,g, nigrosine), lubricants (e.g. linear low density polyethylene, calcium or magnesium stearate or sodium montanate), thermal stabilizers, light stabilizers, flame retardants, nucleating agents and antioxidants.

In some embodiments, the polymer composition also includes one or more other polymers. In some embodiments, the polymer composition includes one or more, distinct LCPs or distinct semi-aromatic, semi-crystalline polyesters.

In some embodiments, the polymer compositions has an apparent melt viscosity ("η") of from 10 Pa·s to 16 Pa·s at a shear rate of 100 $s^{-1}$. In some embodiments, the polymer compositions have a η of from 9 Pa·s to 12 Pa·s, at a shear rate of 400 $s^{-1}$. In some embodiments, the polymer compositions have a of from 7 Pa·s to 9 Pa·s, at a shear rate of 1000 $s^{-1}$. In some embodiments, the polymer compositions have an η of from 5 Pa·s to 7 Pa·s, at a shear rate of 2500 $s^{-1}$. In some embodiments, the polymer compositions have an η of from 3 Pa·s to 5 Pa·s, at a shear rate of 5000 $s^{-1}$. As used herein, refers to the melt viscosity at 360° C., unless explicitly noted otherwise. Melt viscosity can be measured according to ASTM D3835.

As noted above, the polymer compositions have improved mechanical properties. In some embodiments, the polymer composition has a tensile modulus of at least 7 gigapascals ("GPa"), at least 8 GPa, or at least 8.5 GPa. In some embodiments, the polymer composition has a tensile modulus of no more than 15 GPa, no more than 12 GPa, or no more than 10 GPa. In some embodiments, the polymer composition has a tensile modulus of 7 Gpa to 15 GPa, from 8 GPa to 12 GPA, or from 8.5 GPa to 10 GPa. In some embodiments, the polymer composition has a tensile elongation of at least 3.8%, at least 4%, or at least 4.5%. In some embodiments, the polymer composition has a tensile elongation of no more than 10%, no more than 9% or no more than 8%. In some embodiments, the polymer composition has a tensile elongation of from 3.8% to 10%, from 4% to 9%, or from 4.5% to 8.5%. In some embodiments, the polymer compositions have a tensile strength of at least 100 MPa, at least 110 MPa, or at least 115 MPa. In some embodiments, the polymer compositions have a tensile strength of no more than 150 MPA, no more than 140 MPa, or no more than 130 MPa. In some embodiments, the polymer compositions have a tensile strength of from 100 MPa to 150 MPa, from 110 MPa to 140 MPa, or from 115 MPa to 130 MPa. Tensile modulus, strength and elongation can be measured according to ISO 527 with a Type A Specimen.

In some embodiments, the polymer composition has a Tm of at least 280° C., at least 300° C., or at least 320° C. In some embodiments, the polymer composition has a Tm of no more than 420° C., no more than 410° C., or no more than 400° C. In some embodiments, the polymer composition has a Tm of from 280° C. to 420° C., from 300° C. to 400° C., or from 320° C. to 380° C. In some embodiments, the polymer composition has a Tc of at least 250° C., at least 270° C., or at least 280° C. In some embodiments, the polymer composition has a Tc of no more than 340° C., no more than 330° C., or no more than 320° C. In some embodiments, the polymer composition has a Tc of from 250° C. to 340° C., from 270° C. to 330° C., or from 280° C. to 320° C. In some embodiments, the polymer composition has a Tm−Tc of no less than 15° C., no less than 20° C. or no less than 25° C. In some embodiments, the polymer composition has a Tm−Tc of no more than 50° C., no more than 45° C., or no more than 40° C. In some embodiments, the polymer composition has a Tm−Tc of from 15° C. to 50° C., from 20° C. to 45° C., or from 25° C. to 40° C.

Preparation of the Polymer Composition

The polymer compositions can be prepared by melt-blending the LCP, semi-aromatic, semi-crystalline polyester and the specific components, e.g. a filler, a toughener, a stabilizer, and of any other optional additives.

Any suitable melt-blending method known in the art may be used for mixing polymeric ingredients and non-polymeric ingredients in the context of the present invention. For example, polymeric ingredients and non-polymeric ingredients may be fed into a melt mixer, such as single screw extruder or twin screw extruder, agitator, single screw or twin screw kneader, or Banbury mixer, and the addition step may be addition of all ingredients at once or gradual addition in batches. When the polymeric ingredient and non-polymeric ingredient are gradually added in batches, a part of the polymeric ingredients and/or non-polymeric ingredients is first added, and then is melt-mixed with the remaining polymeric ingredients and non-polymeric ingredients that are subsequently added, until an adequately mixed composition is obtained. If a reinforcing agent presents a long physical shape (for example, a long glass fiber), drawing extrusion molding may be used to prepare a reinforced composition.

Film and Film Fabrication

As noted above, films can be formed from the polymer compositions. The films can have an average thickness of at least 5 nm or at least 10 nm. In some embodiments, the films have an average thickness of no more than 200 μm or no more than 100 μm. In some embodiments, the films have an average thickness of from 5 μm to 200 μm or from 10 μm to 100 μm. Average film thickness can be measured according to DIN 53370.

Films including the polymer compositions can be made by any suitable method known in the art. In one approach, the films are made by blown film extrusion. In blown film extrusion, the polymer composition is melted and forced through an annular die. In one approach, pellets of the polymer composition are melted and forced through the annular die. In another approach, during preparation of the polymer composition as described above, the polymer compositions can be directly extruded into the annular die. For example, the ingredients can be fed into an extruder coupled to the annular die such that the process of pellet formation is avoided altogether. As the polymer composition passes through the annular die, air is blow from the center of the annular die and the polymer composition expands into a bubble. The polymer composition is pulled (generally upward) and is cooled. In one embodiments, a cooling ring blows air onto the film to provide cooling. Additionally or alternatively, the bubble can be cooled from within, which maintains the bubble diameter. Subsequent to solidification of the polymer composition, the bubble is flattened by, for example, nip rollers which form two flat film layers. In some embodiments, the film subsequently undergoes post-processing steps including, but not limited to, surface treatment.

Articles and Applications

The polymer compositions can be desirably incorporated into articles. The article can notably be used in mobile electronic and electrical applications, medical device parts, construction applications, industrial applications.

The article can be, for example, an mobile electronic device component. As used herein, a "mobile electronic device" refers to an electronic device that is intended to be conveniently transported and used in various locations. A mobile electronic device can include, but is not limited to, a mobile phone, a personal digital assistant ("PDA"), a laptop computer, a tablet computer, a wearable computing device (e.g., a smart watch, smart glasses and the like), a camera, a portable audio player, a portable radio, global position system receivers, and portable game consoles.

The mobile electronic device component may, for example, comprise a radio antenna and the composition (C). In this case, the radio antenna can be a WiFi antenna or an RFID antenna. The mobile electronic device component may also be an antenna housing.

In some embodiments, the mobile electronic device component is an antenna housing. In some such embodiments, at least a portion of the radio antenna is disposed on the polymer composition (C). Additionally or alternatively, at least a portion of the radio antenna can be displaced from the polymer composition (C). In some embodiments, the device component can be of a mounting component with mounting holes or other fastening device, including but not limited to, a snap fit connector between itself and another component of the mobile electronic device, including but not limited to, a circuit board, a microphone, a speaker, a display, a battery, a cover, a housing, an electrical or electronic connector, a hinge, a radio antenna, a switch, or a switchpad. In some embodiments, the mobile electronic device can be at least a portion of an input device.

Regardless of the application setting, in some embodiments, the polymer composition can be desirably incorporated into printed circuit boards ("PCB") (e.g. flexible PCBs). Printed circuit boards mechanically support and electrically connect electrical or electronic components.

The article can be molded from the polymer composition, by any process adapted to thermoplastics, e.g. extrusion, injection molding, blow molding, rotomolding or compression molding. Preferably, the articles are fabricated using melt extrusion.

Melt extrusion involves forcing molten polymer or polymer composition through a die or orifice. The molten polymer can be formed during melt-blending, as described above, or it can be formed by melting pre-formed polymer or polymer composition, for example, in the form of pellets. For injection molding applications, the molten polymer is forced into a mold, where it solidifies prior to being ejected (removed from the mold). In some embodiments where molten polymer is formed by melt-blending (e.g. extrusion), the mold can be directly or indirectly coupled to the melt-blending apparatus (e.g. extruder) such that the polymer composition is forced into the mold before significantly cooling. In other embodiments, solid pellets of polymer or polymer composition can be melted and the melting apparatus can be directly or indirectly coupled to the mold so that molten polymer or polymer composition can be fed into the mold. The mold corresponds to the shape of the article to be formed. As noted above, because the polymer compositions described herein have desirably low Tm–Tc, the solidification rate of the polymer composition is reduced, relative to corresponding polymer compositions. As a result, cycle times for melt extruded articles (e.g. injection molded articles) is significantly reduced, relative to corresponding polymer compositions.

The article can be printed from the polymer composition, by a process comprising a step of extrusion of the material, which is for example in the form of a filament, or comprising a step of laser sintering of the material, which is in this case in the form of a powder.

The present invention also relates to a method for manufacturing a three-dimensional (3D) object with an additive manufacturing system, comprising: providing a part material comprising the polymer composition, and printing layers of the three-dimensional object from the part material.

The polymer composition can therefore be in the form of a thread or a filament to be used in a process of 3D printing, e.g. Fused Filament Fabrication, also known as Fused Deposition Modelling (FDM).

The polymer composition can also be in the form of a powder, for example a substantially spherical powder, to be used in a process of 3D printing, e.g. Selective Laser Sintering (SLS).

EXAMPLES

The following examples demonstrate the film forming capabilities and the dielectric and mechanical performance of the polymer compositions.

The following materials were used in the examples:

LCP: A liquid crystal polymer formed from the following monomers: isophthalic acid; terephthalic acid; 4,4'-biphenol, p-hydroxybenzoic acid PE 1: Poly(cyclohexylenedimethylene terephthalate) (a semi-aromatic, semi-crystalline polyester)

PE 2: U-Polymer U-100 (amorphous polyester), commercially obtained from Unitika having recurring units represented by the following formula:

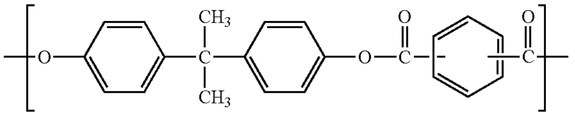

Additive Package: A package consisting of Nylostab® S-EED®, commercially obtained from Clariant; Hostanox® P-EPQ®, commercially obtained from Clariant; and Calcium Stearate

Example 2: Synthesis of LCP

To synthesize the LCP, the dicarboxylic acid monomers (terephthalic acid (167.0 g, Flint Hills Resources), isophthalic acid (55.7 g, Lotte Chemicals), p-hydroxybenzoic acid (555.5 g, Sanfu), 4,4'-biphenol (249.6 g, SI Group) and acetic anhydride (769.2 g, Aldrich)) were charged into a 2-L glass reactor. Potassium acetate (0.07 g, Aldrich) and magnesium acetate (0.2 g, Aldrich) were used as catalysts. The mixture was heated to 165° C. and the acetylation reaction under reflux condition was allowed to proceed for 1 hr. The heating then continued to 300° C. at the rate of 0.5° C. per minute while distilling off acetic acid from the reactor. The pre-polymer was discharged and allowed to cool down. The material was then ground into powder for solid-state polymerization. The resin was advanced in a rotatory oven using the following profile: 1 hr at 220° C., 1 hr at 290° C. and 12 hrs at 310° C. under continuous nitrogen purging. The resulting high molecular resin had melt viscosity between 60-140 Pa-s at 370° C.

Example 3: Sample Formation

To demonstrate film forming capabilities and dielectric and mechanical performance, the following sample compositions were prepared using a twin screw extruder (such as Coperion ZSK26) with a set of controlled process parameters, including barrel temperature profile (80~370° C.), RPM (100~400) and throughput (5~30 kg/hr). Sample parameters are displayed in Table 1.

TABLE 1

| | CE1 | CE2 | E1 |
|---|---|---|---|
| LCP (wt. %) | 99.5 | 94.5 | 94.5 |
| PE 1 (wt. %) | | | 5 |
| PE 2 (wt. %) | | 5 | |
| Additive Package (wt. %) | 0.5 | 0.5 | 0.5 |

Example 4: Formation of Melt Extruded Articles

The present example demonstrates the formation melt extruded articles.

To demonstrate formation, 4 plaques were formed using injection molding with the dimensions of 80×80×1 mm.

Injection molded plaque formed from sample CE1 had significant surface inhomogeneity, characterized by significant discoloration and surface roughness. On the other hand, plaques formed from samples CE2 and E1 were significantly more homogeneous, characterized by uniform color and smoothness.

Example 5: Mechanical and Thermal Performance

The following examples demonstrate the mechanical and thermal performance of the polymer compositions.

To demonstrate mechanical and thermal performance, the test specimen were prepared through injection molding process. Tensile modulus, strength and elongation were measured according to ISO 527 with Type A specimen. The results of mechanical and thermal testing are displayed in Table 2.

TABLE 2

| | CE1 | CE2 | E1 |
|---|---|---|---|
| Tensile Modulus (GPa) | 9.8 | 8.7 | 8.9 |
| Tensile Strength (MPa) | 124.7 | 112.1 | 125.6 |
| Tensile Elongation (%) | 2.4 | 3.6 | 4.6 |
| Tc (° C.) | 298.4 | 300.7 | 300.6 |
| Tm (° C.) | 345.5 | 349.2 | 342.0 |
| Tm − Tc (° C.) | 47.1 | 48.5 | 41.4 |

Referring to Table 2, the sample including the semi-aromatic, semi-crystalline polyester had improved tensile performance, relative to samples including the amorphous polyester in place of the semi-aromatic, semi-crystalline polyester. For example, relative to CE2, E1 had slightly improved tensile modulus and significantly improved tensile strength and elongation. Furthermore, relative to CE1, E1 had slightly improved tensile strength and significantly improved tensile elongation.

Referring again to Table 2, the sample including the semi-aromatic, semi-crystalline polyester had significantly reduced Tm−Tc, relative to corresponding polymer compositions. For example, E1 had a Tm−Tc of 41.4° C., a 15% reduction relative to Tm−Tc of CE2 and a 12% reduction relative to Tm−Tc of CE1.

Further Inventive Concepts

The present section describes further inventive concepts that are within the scope of the disclosure.

Inventive Concept 1. A polymer compositions comprising:

a liquid crystal polymer ("LCP") formed from the polycondensation of the following monomers: terephthalic acid, an aromatic diol, a first aromatic dicarboxylic acid, an aromatic hydrocarboxylic acid; and 1 wt. % to 25 wt. %, of a semi-aromatic, semi-crystalline polyester ("PE") formed from the polycondensation of an aliphatic diol and a second aromatic dicarboxylic acid, relative to the total weight of the LCP and PE, Inventive Concept 2. The polymer composition of inventive concept 1, wherein the aromatic diaol is represented by a formula selected from the following group of formulae $$HO—Ar_1—OH, \text{ and} \tag{1}$$

$$HO—Ar_2\text{-}T_1\text{-}Ar_3—OH, \tag{2}$$

wherein, the first aromatic dicarboxylic acid is independently represented by a formula selected from the following group of formulae:

$$HOOC\text{-}Ar1\text{-}COOH, \text{ and} \tag{3}$$

$$HOOC—Ar_2\text{-}T_2\text{-}Ar_3—COOH, \text{ and} \tag{4}$$

the aromatic hydroxycarboxylic acid is represented by a formula selected from the group consisting of $$HO—Ar_1—COOH, \text{ and} \tag{5}$$

$$HO—Ar_2—Ar_3—COOH, \tag{6}$$

wherein $Ar_1$ to Ara, $T_1$ and $T_2$, are independently selected and given above.

Inventive Concept 3: The polymer composition of inventive concept 2, wherein the aromatic diol is selected from the group consisting of 1,3-dihydroxybenzene, 1,4-dihydroxybenzene, 2,5-biphenyldiol, 4,4'-biphenol, 4,4'-(propane-2,2-diyl)diphenol, 4,4'-(ethane-1,2-diyl)diphenol, 4,4'-methylenediphenol, bis(4-5 hydroxyphenyl) methanone, 4,4'-oxydiphenol, 4,4'-sulfonyldiphenol, 4,4'-thiodiphenol, naphthalene-2,6-diol, and naphthalene-1,5-diol;

wherein the first aromatic dicarboxylic acid is selected from the group consisting of isophthalic acid, 4,4'-biphenyldicarboxylic acid, 4,4'-oxydibenzoic acid, 4,4'-(ethylenedioxy)dibenzoic acid, 4,4'-sulfanediyldibenzoic acid, naphthalene-2,6-dicarboxylic acid, naphthalene-1,4-dicarboxylic acid, naphthalene-1,5-dicarboxylic acid, and naphthalene-2,3-dicarboxylic acid; and wherein the aromatic hydroxycarboxylic acid is selected from the group consisting of 4-hydroxybenzoic acid, 3-hydroxybenzoic acid, 6-hydroxy-2-naphthoic acid, 6-hydroxy-1-naphthoic acid, 2-hydroxy-1-naphthoic acid, 3-hydroxy-2-naphthoic acid, 1-hydroxy-2-naphthoic acid, 5-hydroxy-1-naphthoic acid, and 4'-hydroxy-[1,1'-biphenyl]-4-carboxylic acid.

Inventive Concept 4: The polymer composition of inventive concept 3, wherein the aliphatic diol is selected from the group consisting of 1,4-cyclohexanedimethanol, ethylene glycol, 1,2-propanediol, 1,3-propanediol, 1,4-butanediol, 1,5-pentanediol, 1,6-hexanediol, 1,8-octanediol, 1,10-decanediol, 2,2,4-trimethyl 1,3-pentanediol, 2,2,4,4-tetramethyl-1,3-cyclobutanediol, and neopentyl glycol; and wherein the aromatic dicarboxylic acid is selected from the group consisting of terephthalic acid, isophthalic acid, and a naphthalene dicarboxylic acid.

Inventive Concept 5: The polymer composition of inventive concept 4, wherein the PE is selected from the group consisting of poly(cyclohexanedimethylene terephthalate) ("PCT"), polyethylene terephthalate ("PET"), polybutylene terephthalate ("PBT"), polyethylene naphthalate ("PEN") and polybutylene naphthalate ("PBN"), preferably the PE is PCT.

Inventive Concept 6: The polymer composition of inventive concept 5, wherein the polymer composition is free of a fibrous reinforcing agent.

Inventive Concept 7: The polymer composition of inventive concept 6, wherein the polymer composition is free of a reinforcing agent.

Inventive Concept 8: The polymer composition of any one of inventive concepts 1 to 7, wherein the polymer composition has a tensile elongation of at least 4% and a tensile strength of from 100 MPa to 150 M.

Inventive Concept 9: The polymer composition of any one of inventive concepts 1 to 8, wherein the polymer composition has a Tm−Tc of no more than 50° C., wherein Tm is the melting temperature and Tc is the crystallization temperature.

Inventive Concept 10. An article comprising the polymer composition of any one of inventive concepts 1 to 9.

Inventive Concept 11. The article of inventive concept 10, wherein the article is a mobile electronic device component.

Inventive Concept 12. The article of inventive concept 11, wherein the article is a printed circuit board.

Inventive Concept 13. A film comprising the polymer composition of any one of inventive concepts 1 to 9, wherein the film has an average thickness of from 5 μm to 200 μm, as measured according to DIN 53370.

The embodiments above are intended to be illustrative and not limiting. Additional embodiments are within the inventive concepts. In addition, although the present invention is described with reference to particular embodiments, those skilled in the art will recognized that changes can be made in form and detail without departing from the spirit and scope of the invention. Any incorporation by reference of documents above is limited such that no subject matter is incorporated that is contrary to the explicit disclosure herein.

The invention claimed is:

1. A polymer composition consisting of:

a liquid crystal polymer ("LCP") formed from the polycondensation of the following monomers: terephthalic acid, 4,4'-biphenol, isophthalic acid, and 4-hydroxybenzoic acid;

1 wt. % to 15 wt. %, of poly(cyclohexanedimethylene terephthalate) ("PE"), relative to the total weight of the LCP and PE; and a component selected from the group consisting of tougheners, plasticizers, colorants, pigments, antistatic agents, dyes, lubricants, thermal stabilizers, light stabilizers, flame retardants, nucleating agents, and antioxidants;

wherein the polymer composition is free of reinforcing agents, wherein the polymer composition has a tensile strength of from 100 MPa to 150 MPa, tensile strength being measured according to ISO 527 with a Type A Specimen, wherein the polymer composition has a Tm−Tc of no more than 45° C., wherein Tm is the melting temperature and Tc is the crystallization temperature, Tm and Tc being measured using differential scanning calorimetry ("DSC") according to ISO-11357-3, and wherein the LCP has recurring units RLCP1 to RLCP4:

$R_{LCP1}$ is represented by the following formula:

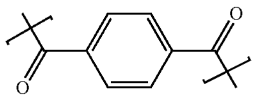

$R_{LCP1}$ $R_{LCP2}$ is represented by the following formula:

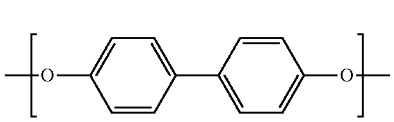

$R_{LCP2}$ $R_{LCP3}$ is represented by the following formula:

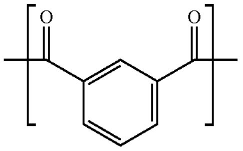

$R_{LCP3}$ $R_{LCP4}$ is represented by the following formula:

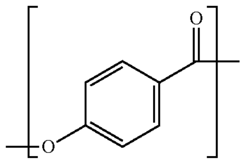

$R_{LCP4}$ the total concentration of recurring units $R_{LCP1}$ to $R_{LCP4}$ being at least 99.9 mol %, mol % being relative to the total number of recurring units in the polymer; and the concentration of recurring units $R_{LCP1}$ to $R_{LCP4}$ being the following:

the concentration of $R_{LCP1}$ is from greater than 10 mol % to 20 mol %, the concentration of $R_{LCP2}$ is from 15 mol % to 25 mol %, the concentration of $R_{LCP3}$ is from 1 mol % to less than 10 mol %, and the concentration of $R_{LCP4}$ is from 50 mol % to 70 mol %.

2. The polymer composition of claim 1, wherein the polymer composition has a tensile elongation of at least 4%, tensile elongation being measured according to ISO 527 with a Type A Specimen.

3. An article comprising the polymer composition of claim 1.

4. The article of claim 3, wherein the article is a mobile electronic device component.

5. The article of claim 3, wherein the article is a printed circuit board.

6. A film comprising the polymer composition of claim 1, wherein the film has an average thickness of from 5 μm to 200 μm, as measured according to DIN 53370.

7. The polymer composition of claim 1, wherein the PE is in an amount of 3 wt. % to 15 wt. %, relative to the total weight of the LCP and PE.

8. The polymer composition of claim 1, wherein the component selected from the group consisting of tougheners, plasticizers, colorants, pigments, antistatic agents, dyes, lubricants, thermal stabilizers, light stabilizers, flame retardants, nucleating agents, and antioxidants is present in an amount of less than or equal to 0.5 wt %.

9. The polymer composition of claim 1, wherein the composition is melt-blended.

10. The polymer composition of claim 1, wherein the polymer composition has an apparent melt viscosity of from 10 Pa·s to 16 Pa·s at a shear rate of 100 $s^{-1}$ as measured according to ASTM D3835 at a temperature of 360° C.

11. The polymer composition of claim 1, wherein the polymer composition has an apparent melt viscosity of from 10 Pa·s to 16 Pa·s at a shear rate of 100 $s^{-1}$, and/or from 9 Pa·s to 12 Pa·s at a shear rate of 400 $s^{-1}$, and/or from 7 Pa·s to 9 Pa·s at a shear rate of 1000 $s^{-1}$, and/or from 5 Pa·s to 7 Pa·s at a shear rate of 2500 $s^{-1}$, and/or from 3 Pa·s to 5 Pa·s at a shear rate of 5000 $s^{-1}$, as measured according to ASTM D3835 at a temperature of 360° C.

12. The polymer composition of claim 1, wherein the polymer composition has a tensile modulus of at least 8 GPa and no more than 15 GPa.

13. The polymer composition of claim 1, wherein the polymer composition has a tensile modulus of no more than 10 GPa.

14. The polymer composition of claim 1, wherein the polymer composition has a tensile modulus of at least 8 GPa and no more than 10 GPa.

15. The polymer composition of claim 1, wherein the LCP has a number average molecular weight of from 5,000 g/mol to 20,000 g/mol, determined by gel permeation chromatography (GPC) according to ASTM D5296 and using hexafluoroisopropanol solvent and poly(methyl methacrylate) standard.

16. The polymer composition of claim 1, wherein the LCP has an intrinsic viscosity of 0.5 to 1.4 dl/g.

* * * * *